US012560307B2

(12) United States Patent
Chen et al.

(10) Patent No.: US 12,560,307 B2
(45) Date of Patent: Feb. 24, 2026

(54) LIGHT SOURCE SYSTEM WITH LENS ARRAY ADJUSTING MECHANISM AND LIGHT EMITTING DEVICE

(71) Applicant: YLX INCORPORATED, Shenzhen (CN)

(72) Inventors: Hui Chen, Shenzhen (CN); Yeju Liang, Shenzhen (CN); Quan Zhang, Shenzhen (CN)

(73) Assignee: YLX INCORPORATED, Shenzhen (CN)

( * ) Notice: Subject to any disclaimer, the term of this patent is extended or adjusted under 35 U.S.C. 154(b) by 0 days.

(21) Appl. No.: 18/697,023

(22) PCT Filed: Nov. 7, 2022

(86) PCT No.: PCT/CN2022/130235

§ 371 (c)(1),
(2) Date: Aug. 28, 2024

(87) PCT Pub. No.: WO2023/197582

PCT Pub. Date: Oct. 19, 2023

(65) Prior Publication Data

US 2025/0320981 A1 Oct. 16, 2025

(30) Foreign Application Priority Data

Apr. 11, 2022 (CN) ......................... 202210375317.8

(51) Int. Cl.
*F21V 14/06* (2006.01)
*F21V 5/00* (2018.01)
(Continued)

(52) U.S. Cl.
CPC .............. *F21V 14/06* (2013.01); *F21V 5/007* (2013.01); *F21Y 2105/10* (2016.08); *F21Y 2113/00* (2013.01); *F21Y 2115/10* (2016.08)

(58) Field of Classification Search
CPC ....... F21V 14/06; F21V 5/007; F21Y 2105/10
See application file for complete search history.

(56) References Cited

U.S. PATENT DOCUMENTS 5,068,768 A * 11/1991 Kobayashi ............ F21S 41/635
362/268
2005/0265024 A1 12/2005 Luk
(Continued)

FOREIGN PATENT DOCUMENTS

CN 103968268 A 8/2014
CN 206973339 U 2/2018
(Continued)

OTHER PUBLICATIONS

International Search Report for Application No. PCT/CN2022/130235 mailed Jan. 28, 2023.
(Continued)

*Primary Examiner* — James R Greece
*Assistant Examiner* — Michael Chiang
(74) *Attorney, Agent, or Firm* — Michael P. Furmanek

(57) ABSTRACT

A light source system, comprising: a light source mechanism comprising a light source substrate and a plurality of light emitting diode modules provided on the light source substrate, wherein the light emitting diode module includes at least two light emitting diode chips; a collimating lens group comprising a lens support and collimating lens units provided on the lens support, wherein the collimating lens unit
(Continued)

is configured for collecting exiting light of the light emitting diode module; and an adjusting mechanism comprising a mounting support and an adjusting block, wherein the lens support is assembled on the mounting support, and the adjusting block is configured for adjusting a displacement of the collimating lens group on the mounting support.

10 Claims, 7 Drawing Sheets

(51) Int. Cl.

| | |
|---|---|
| *F21Y 105/10* | (2016.01) |
| *F21Y 113/00* | (2016.01) |
| *F21Y 115/10* | (2016.01) |

(56) References Cited

U.S. PATENT DOCUMENTS

| | | | | |
|---|---|---|---|---|
| 2014/0185285 | A1 | 7/2014 | Jorgensen | |
| 2015/0211708 | A1* | 7/2015 | Stavely | F21V 23/0464 362/231 |
| 2016/0084481 | A1* | 3/2016 | Duckworth | F21V 5/007 362/240 |
| 2020/0340644 | A1* | 10/2020 | Lang | F21S 8/086 |
| 2024/0230063 | A1* | 7/2024 | Chen | F21V 14/06 |

FOREIGN PATENT DOCUMENTS

| | | | |
|---|---|---|---|
| CN | 110778939 | A | 2/2020 |
| CN | 213040402 | U | 4/2021 |
| CN | 213840527 | U | 7/2021 |
| CN | 113390036 | A | 9/2021 |
| CN | 113390037 | A | 9/2021 |
| CN | 113531441 | A | 10/2021 |
| CN | 113915577 | A | 1/2022 |
| EP | 3557126 | A1 | 10/2019 |
| WO | WO-81/01753 | | 6/1981 |

OTHER PUBLICATIONS

Office Action, Chinese patent application No. 202210375317.8, issued Jun. 14, 2024.

European Search Report for Application No. 22937214 dated Jul. 29, 2025.

* cited by examiner

LIGHT SOURCE SYSTEM WITH LENS ARRAY ADJUSTING MECHANISM AND LIGHT EMITTING DEVICE

CROSS-REFERENCE TO RELATED APPLICATIONS

This is the United States National Phase of International Patent Application No. PCT/CN2022/130235, filed on Nov. 7, 2022, which claims priority to Chinese Patent Application No. 202210375317.8, filed on Apr. 11, 2022, the contents of which are incorporated herein by reference in their entireties.

TECHNICAL FIELD

The present disclosure relates to the field of illumination technologies and, in particular, to a light source system.

BACKGROUND

In the field of illumination technologies, a light emitting diode (LED) is generally used as a light source of a system, and light emitted from the light emitting diode is collected and emitted through a collimating lens.

In the related art, the light source system needs to realize different colors, color temperature, brightness and color rendering indexes, and thus generally requires to adopt two or more light emitting diodes with different characteristics. A common manner is to use the two or more light emitting diodes with different characteristics as a package module, and the light emitted by the package module is collected through a collimating lens. However, this manner has a problem that a main optical axis of the exiting light of each light emitting diode does not overlap with a central axis of the collimating lens but with a deviation, so that the light efficiency of the whole light source system is relatively low. In this regard, how to improve the light efficiency of the light source system has become an increasingly important issue.

SUMMARY

Aiming at the defect of low light efficiency of the light source system in the related art, the present disclosure provides a light source mechanism, the light source mechanism includes a light source substrate and multiple light emitting diode modules provided on the light source substrate, the light emitting diode modules includes at least two light emitting diode chips; a collimating lens group, the collimating lens group includes a lens support and a collimating lens unit provided on the lens support, the collimating lens unit is configured for collecting exiting light of the light emitting diode module; and an adjusting mechanism, the adjusting mechanism includes a mounting support and an adjusting block, the lens support is assembled on the mounting support, and the adjusting block is configured to adjust the displacement of the collimating lens group on the mounting support.

In one embodiment, the lens support includes a support plate and a plurality of lens holes provided in the support plate, and the collimating lens units are provided in the lens holes.

In one embodiment, the lens support further includes a first mounting portion, a second mounting portion, a first mounting member and a second mounting member that extend from an edge of the support plate. Ends of the first mounting portion and the second mounting portion are provided with protruding columns, and the first mounting member and the second mounting member each include a first sleeve member and a second sleeve member.

In one embodiment, the mounting support includes an assembly area located at an edge and an accommodation area located at a center, and the adjusting mechanism further includes a first mounting groove, a second mounting groove, a first limiting module and a second limiting module located in the assembly area of the mounting support. The first limiting module includes a first limiting plate and a first spring, the first limiting plate is fixed to an opening part of the first mounting groove through a locking screw, a first limiting column is provided on a side of the first limiting plate facing the mounting groove, and the first spring is provided in the first mounting groove. One end of the first spring is sleeved on a protruding column at an end of the first mounting portion, and the other end of the first spring is sleeved on the first limiting column of the first limiting plate. The second limiting module includes a second limiting plate and a second spring, the second limiting plate is fixed to an opening part of the second mounting groove through a locking screw, a second limiting column is provided on a side of the second limiting plate facing the mounting groove, and the second spring is provided in the second mounting groove. One end of the second spring is sleeved on a protruding column at an end portion of the second mounting portion, and the other end of the second spring is sleeved on the second limiting column of the second limiting plate.

In one embodiment, the adjusting mechanism further includes a first screw, a second screw, a mounting composite groove and a second mounting composite groove, the first mounting member of the lens support is sleeved on the first screw, and two ends of the first screw are pressed in the first mounting composite groove by means of screw locking plates. The second mounting member of the lens support is sleeved on the second screw, and two ends of the second screw are pressed in the second mounting composite groove by means of screw locking plates.

In one embodiment, the adjusting mechanism includes a first mounting platform and a slide rail provided on the first mounting platform, a side of the adjusting block facing the first mounting platform is provided with a slide groove, and the adjusting block is assembled to the first mounting platform by clamping the slide groove with the slide rail.

In one embodiment, the lens support includes a bearing mounting hole, the adjusting mechanism includes a bearing, and the bearing is locked in the bearing mounting hole by a screw. The adjusting block includes a first step and a second step abutting against the bearing. The bearing rolls between the first step and the second step of the adjusting block.

In one embodiment, the adjusting mechanism further includes an adjusting screw and a sleeve, the sleeve is fixed to a mounting surface of the adjusting block, and the sleeve is sleeved on one end of the adjusting screw through threaded connection.

In one embodiment, the adjusting mechanism further includes a screw fixing base, the screw fixing base is provided with a screw through hole, the other end of the adjusting screw passes through the screw fixing base and is slidably arranged on the screw fixing base, one end of the adjusting screw is provided with a rotating device, and the rotating device is twisted to drive the adjusting screw to rotate.

In a second aspect, the present disclosure provides a light emitting device including the light source system according to any one of the above embodiments.

Compared with the related art, the present disclosure has the following beneficial effects:

According to the light source system in the embodiments of the present disclosure, the displacement of the collimating lens group on the mounting support is adjusted through the adjusting block, so that the main optical axis of the exiting light of the light emitting diode chip overlaps with the central axis of the collimating lens unit, the light efficiency of the light source system is improved. In addition, the light source system may realize switching of different modes, the light source systems under different modes have different lighting characteristics, and the application of the light source system is optimized.

DESCRIPTION OF EMBODIMENTS

The technical solutions in embodiments of the present disclosure will be described clearly and completely below in connection with the drawings in the present disclosure. It will be apparent that the embodiments described here are only a part of the embodiments of the present disclosure, not all of them. All other embodiments, based on the embodiments in the present disclosure, obtained by those skilled in the art without creative efforts shall fall within the protection scope of the present disclosure.

A light source system, which includes: a light source mechanism including a light source substrate and a plurality of light emitting diode modules provided on the light source substrate, and the light emitting diode module includes at least two light emitting diode chips; a collimating lens group including a lens support and a collimating lens unit provided on the lens support, and the collimating lens unit is used for collecting exiting light of the light emitting diode module; and an adjusting mechanism including a mounting support and an adjusting block, the lens support is assembled on the mounting support, and the adjusting block is configured to adjust a displacement of the collimating lens group on the mounting support.

The following is described with reference to specific embodiments.

Figure 1:
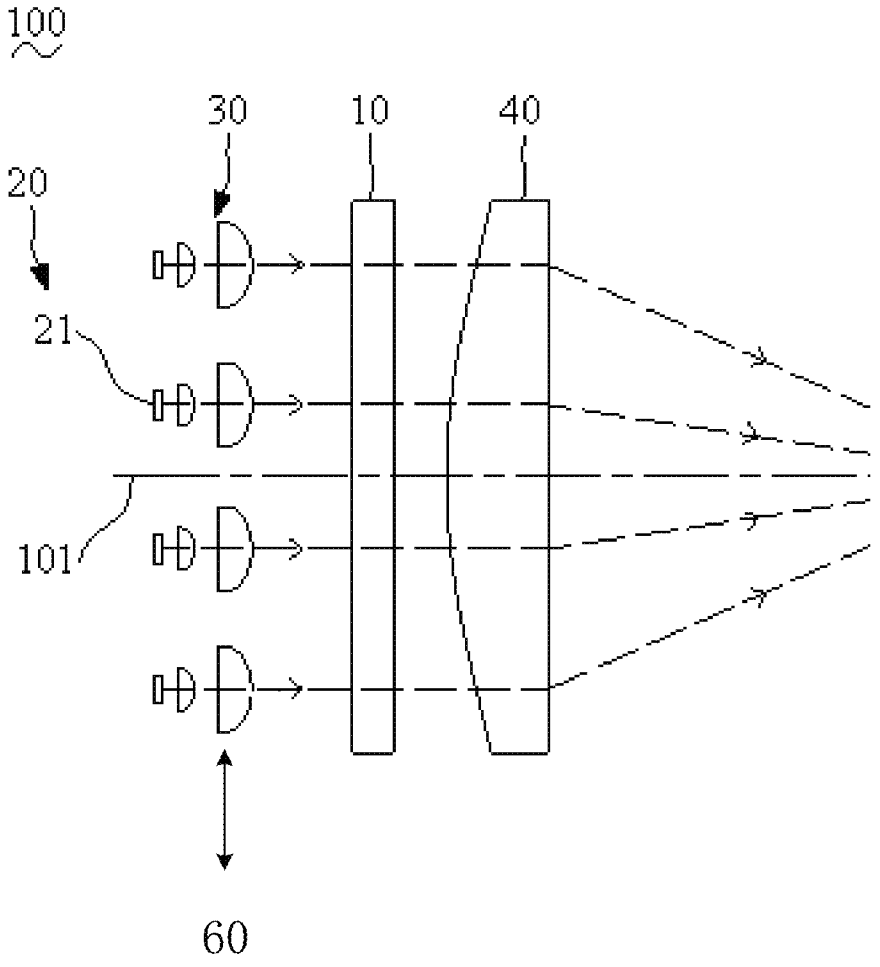
FIG. 1 is a schematic diagram of a light source system according to an embodiment of the present disclosure.
Figure 2:
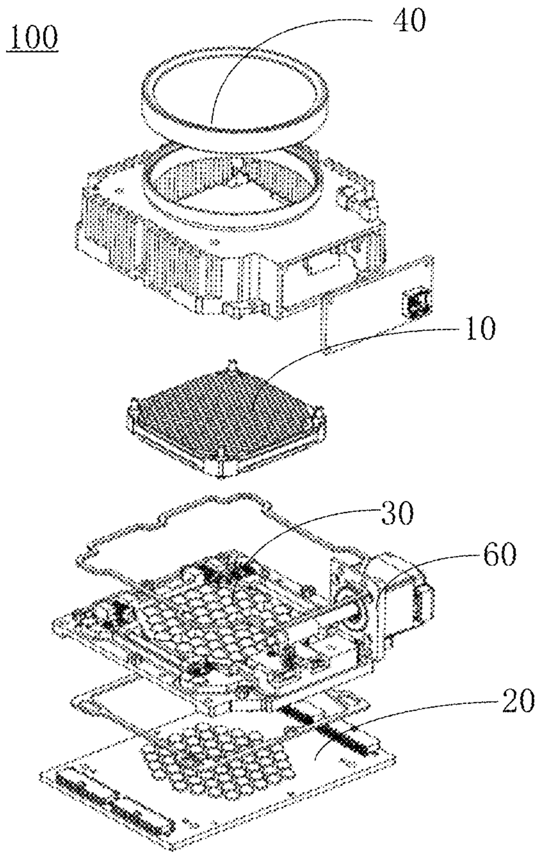
FIG. 2 is a schematic structural diagram of a light source system according to an embodiment of the present disclosure.

Referring to FIG. 1 and FIG. 2, embodiments of the present disclosure provide a light source system 100 including a light source mechanism 20, and the light source mechanism includes multiple light emitting diode (LED) modules 21 distributed in an array; a collimating lens group 30 arranged in an exiting light path of the multiple light emitting diode modules 21, the collimating lens group includes at least two collection lens arrays, each collection lens array includes multiple collimating lens units 301, and each collimating lens unit corresponds to the light emitting diode module 21 and is configured to collimate a light beam emitted by the LED module 21; a compound eye lens 10 provided in an exiting light path of the collimating lens group, and the compound eye lens 10 includes multiple microlens units; and a condenser lens 40 provided on an exiting light path of the compound eye lens 10, and the condenser lens 40 is configured to converge and emit the exiting light of the compound eye lens on a GOBO (not shown) of the light source system. The light source system 100 further includes an adjusting mechanism 60 configured to adjust the displacement of the collimating lens group 30.

Figure 3:
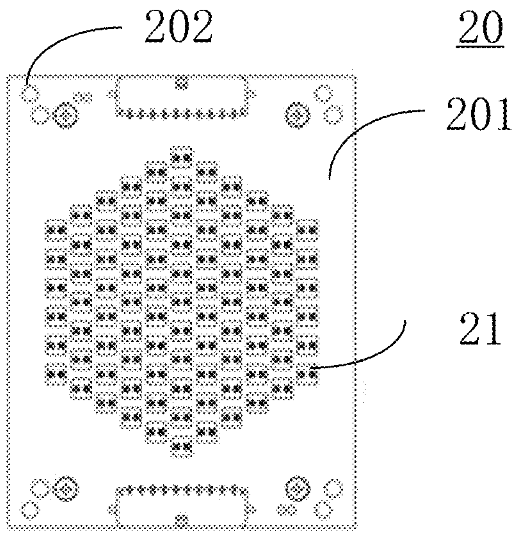
FIG. 3 is a schematic diagram of a light source mechanism according to an embodiment of the present disclosure.

In embodiments as shown in FIG. 3, the light source mechanism 20 includes a light source substrate 201 and multiple light emitting diode modules 21 provided on the light source substrate 201. The centers of the multiple adjacent light emitting diode modules 21 are distributed in a regular triangle shape, a square shape, or a regular polygon shape. The light emitting diode module 21 includes two or more light emitting diode chips with different properties, for example, light emitting diode chips with different colors, light emitting diode chips with different color temperatures, light emitting diode chips with different optical powers, or light emitting diode chips with different color rendering indexes. The light source mechanism 20 includes positioning holes 202 provided at corners of the light source substrate, and the positioning holes 202 are configured for positioning the light source mechanism during assembly with respect to other mechanism components.

Figure 4:
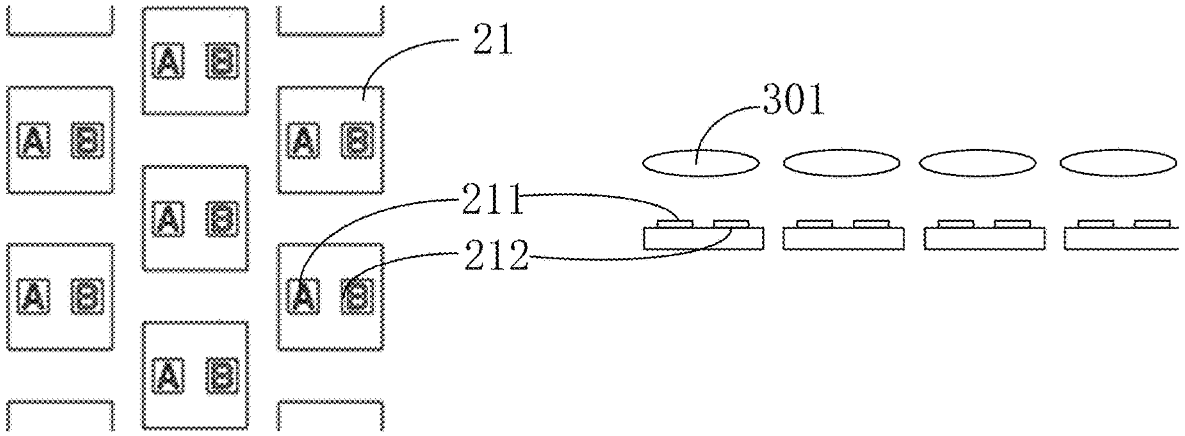
FIG. 4 is a schematic diagram of a light emitting diode module according to an embodiment of the present disclosure.

As shown in FIG. 4, in an embodiment, the light emitting diode module 21 includes a first light emitting diode chip 211 and a second light emitting diode chip 212 that emit light with two different color temperatures. The first light emitting diode chip 211 is a light emitting chip that emits light beam with a first color temperature, and the second light emitting diode chip 212 is a light emitting chip that emits light beam with a second color temperature. In some embodiments, the first color temperature is a high color temperature, the second color temperature is a low color temperature. It is understandable that in other embodiments, the first color temperature and the second color temperature may be both high color temperatures or both low color temperatures. In some embodiments, the arrangements of the first light emitting diode chip 211 and the second light emitting diode chip 212 are the same in the light emitting diode module 21, that is, the arrangements of the two light emitting diode chips in each light emitting diode module 21 are the same.

In some other embodiments, the light emitting diode module 21 may include a first light emitting diode chip 211 and a second light emitting diode chip 212 that emit light with two different colors. The first light emitting diode chip 211 is a light emitting chip that emits a light beam of a first color, and the second light emitting diode chip 212 is a light emitting chip that emits a light beam of a second color. The first color may be a long wavelength light such as red light, and the second color may be a short wavelength light such as blue light. It is understandable that in other embodiments, the first color and the second color may be both red light with different dominant wavelengths, or the first color and the second color may be both green light or blue light with different dominant wavelengths.

In some other embodiments, the light emitting diode module 21 may include a first light emitting diode chip 211 and a second light emitting diode chip 212 that emit light with different brightness. The first light emitting diode chip 211 is a light emitting chip that emits light with a first brightness, and the second light emitting diode chip 212 is a light emitting chip that emits light with a second brightness. The first brightness may be a high brightness, and the second brightness may be a low brightness. It is understandable that in some other embodiments, the first brightness and the second brightness may be both high brightness or both low brightness.

In some other embodiments, the light emitting diode module 21 may include a first light emitting diode chip 211 and a second light emitting diode chip 212 that emit light with two different color rendering indexes. The first light emitting diode chip 211 is a light emitting chip that emits light with a first color rendering index, and the second light emitting diode chip 212 is a light emitting chip that emits light with a second color rendering index. The first color rendering index may be a high color rendering index, and the second color rendering index may be a low color rendering index. It is understandable that in some other embodiments, the first color rendering index and the second color rendering index may be both high color rendering indexes or both low color rendering indexes.

Figure 5:
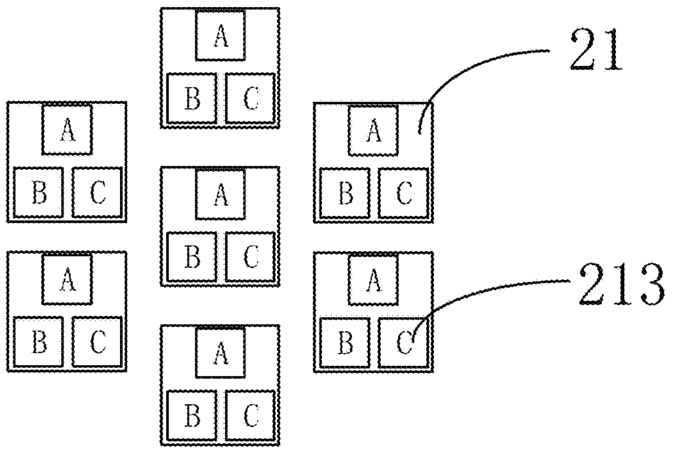
FIG. 5 is a schematic diagram of a light emitting diode module according to another embodiment of the present disclosure.

In some other embodiments, the light emitting diode module 21 may include light emitting diode chips that emit three different color temperatures. As shown in FIG. 5, the light emitting diode module 21 includes a third light emitting diode chip 213 configured to emit light of a third color temperature, the third color temperature may be between the first color temperature and the second color temperature. It is understandable that the third light emitting diode chip 213 may emit light of a third brightness, a third color or a third color rendering index, the third brightness may be between the first brightness and the second brightness, the third color wavelength may be between the first color wavelength and the second color wavelength, and the third color rendering index may be between the first color rendering index and the second color rendering index.

In some embodiments, referring to FIG. 4, taking the light emitting diode module 21 including light emitting diode chips emitting light with two different color temperatures as an example, in this case, the first light emitting diode chip 211 and the second light emitting diode chip 212 are configured as one package module and share one collimating lens unit 301. The problem of the solution may be that the main optical axis of the exiting light of the first light emitting diode chip 211 or the second light emitting diode chip 212 does not overlap with the central axis of the collimating lens unit 301, so that a larger part of the light emitted by the first light emitting diode chip and the second light emitting diode chip is not collected by the collimating lens unit and is then wasted, resulting in low light efficiency of the entire light source system.

The present disclosure provides a light source system, the light source system includes an adjusting mechanism 60. The adjusting mechanism 60 is configured for adjusting the relationship between a collimating lens unit 301 and a light emitting diode chip, so that the main optical axis of the exiting light of a first light emitting diode chip or a second light emitting diode chip included in a light emitting diode module 21 overlaps with the central axis of the collimating lens unit in different dimming modes.

Figure 6:
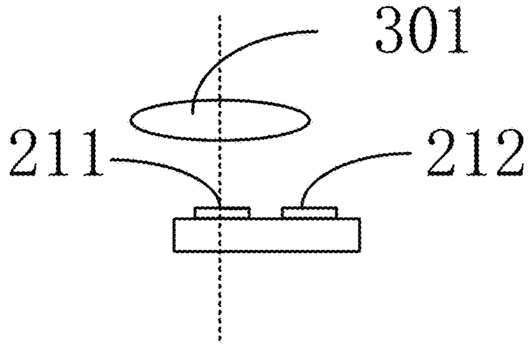
FIG. 6 is a schematic diagram of a light source system in a first mode according to an embodiment of the present disclosure.

Referring to FIG. 6, FIG. 6 is a schematic diagram of the light source system in the first mode. In this situation, the main optical axis of the exiting light of the first light emitting diode chip overlaps with the central axis of the collimating lens unit 301 through adjustment of the adjusting mechanism 60, the collimating lens unit 301 may maximize the collection of the light emitted by the first light emitting diode chip. In the meantime, the main optical axis of the exiting light of the second light emitting diode chip deviates greatly from the central axis of the collimating lens unit 301, and the collimating lens unit 301 is difficult to collect the light emitted by the second light emitting diode chip. Therefore, in the first mode, the second light emitting diode chip 212 may be turned off. In conclusion, in the first mode, the main optical axis of the exiting light of the first light emitting diode chip 211 overlaps with the central axis of the collimating lens unit 301, the collimating lens unit may maximize the collection of the exiting light of the first light emitting diode chip, and the first light emitting diode chip may emit light with the first color temperature, so that the light source system emits the illumination light with the first color temperature, which improve the light efficiency of the light source system, and realize the color temperature switching of the light source system, and thereby achieving energy conservation and environmental protection. It should be noted that FIG. 6 schematically illustrates a single first light emitting diode chip and a collimating lens unit as an example, and for other first light emitting diode chips of the light source system, the optical schematic diagram thereof in the first mode is the same as that of FIG. 6, which is not repeated herein. In addition, it should be noted that the main optical axis of the exiting light of the first light emitting diode chip 211 overlaps with the central axis of the collimating lens unit 301, and the present disclosure does not limit that the main optical axis of the exiting light completely overlaps with the central axis, and situations such as substantial overlapping or overlapping within a threshold range also fall in the protection scope of the present disclosure.

Figure 7:
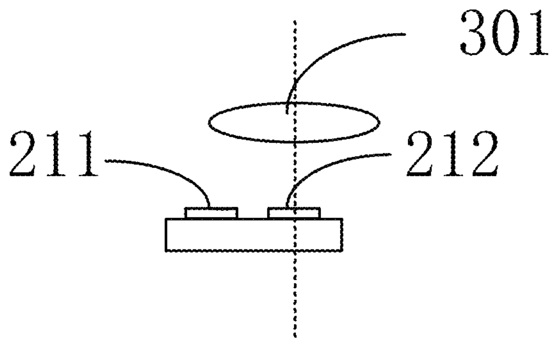
FIG. 7 is a schematic diagram of a light source system in a second mode according to an embodiment of the present disclosure.
Figure 8:
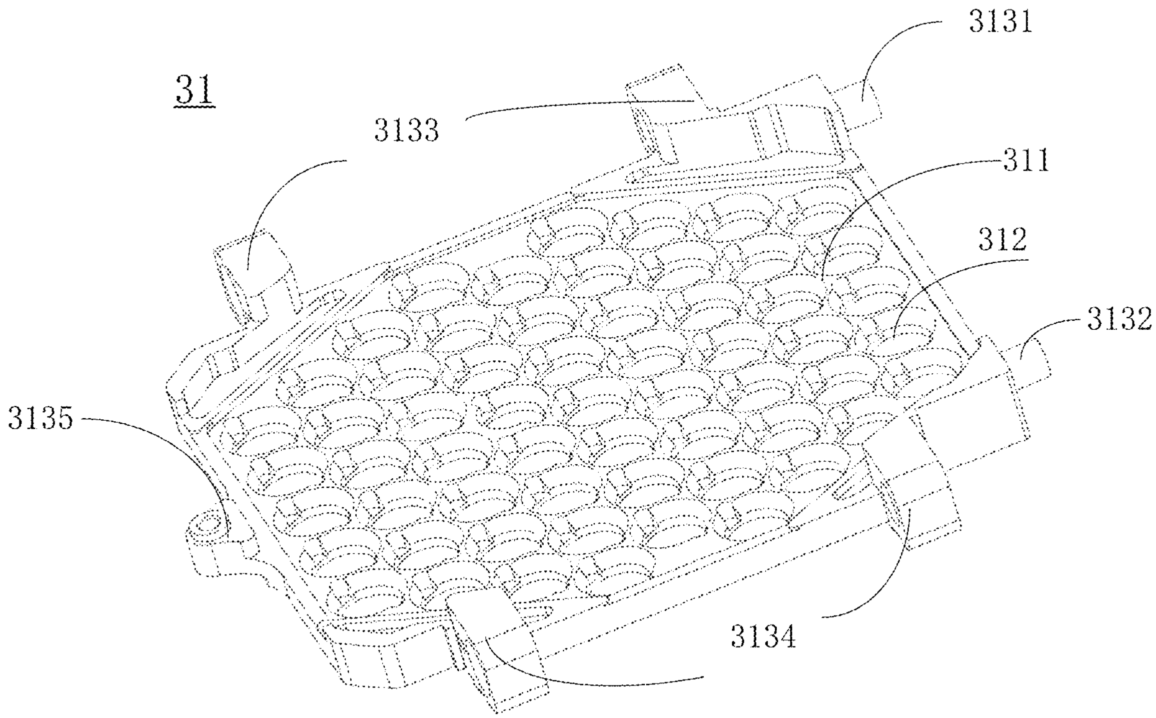
FIG. 8 is a schematic structural diagram of a lens support according to an embodiment of the present disclosure.
Figure 9:
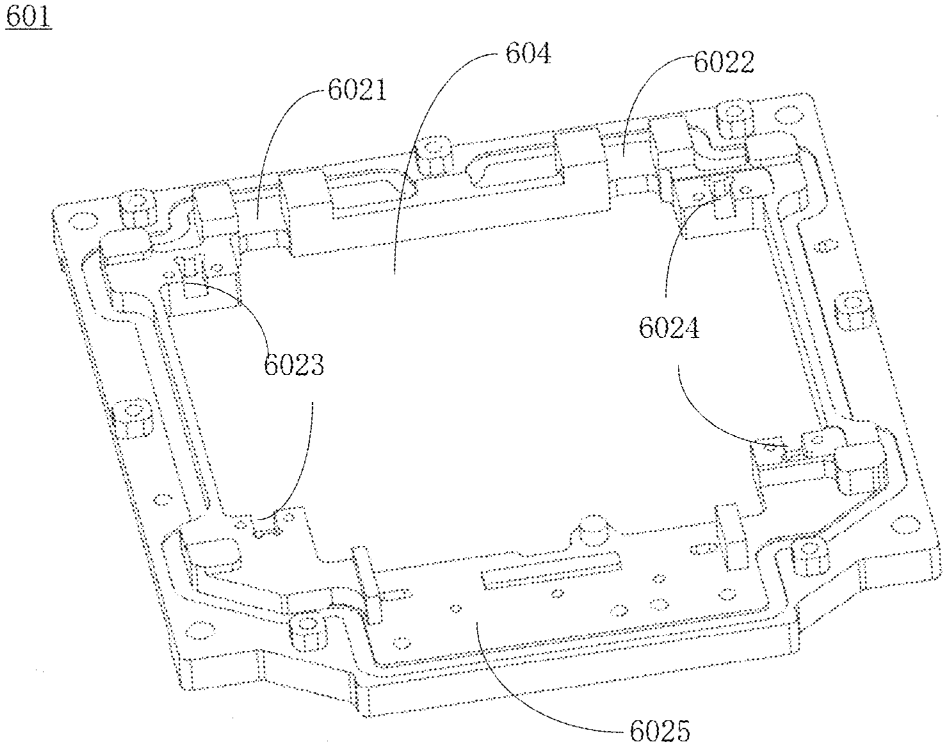
FIG. 9 is a schematic structural diagram of an adjusting mechanism according to an embodiment of the present disclosure.

Referring to FIG. 7, FIG. 7 is a schematic diagram of the light source system in the second mode. In this situation, the main optical axis of the exiting light of the second light emitting diode chip overlaps with the central axis of the collimating lens unit 301 through adjustment of the adjusting mechanism 60, the collimating lens unit 301 may maximize the collection of the light emitted by the second light emitting diode chip. In the meantime, the main optical axis of the exiting light of the first light emitting diode chip deviates greatly from the central axis of the collimating lens unit 301, and the collimating lens unit 301 is difficult to collect the light emitted by the first light emitting diode chip. Therefore, in the second mode, the first light emitting diode chip 212 may be turned off. In conclusion, in the second mode, the main optical axis of the exiting light of the second light emitting diode chip 211 overlaps with the central axis of the collimating lens unit 301, the collimating lens unit may maximize the collection of the exiting light of the second light emitting diode chip, and the second light emitting diode chip emit light with the second color temperature, so that the light source system emits the illumination light with the second color temperature, which improve the light efficiency of the light source system, and realize the color temperature switching of the light source system, and thereby achieving energy conservation and environmental protection. It should be noted that FIG. 7 schematically illustrates a single second light emitting diode chip and a collimating lens unit as an example, and for other second light emitting diode chips of the light source system, the optical schematic diagram thereof in the second mode is the same as that of FIG. 7, which is not repeated herein. In addition, it should be noted that the main optical axis of the exiting light of the second light emitting diode chip 212 overlaps with the central axis of the collimating lens unit 301, and the present disclosure does not limit that the main optical axis of the exiting light completely overlaps with the central axis, and situations such as substantial overlapping or overlapping in a threshold range also fall in the protection scope of the present disclosure.

By adjusting the positional relationship between the light emitting diode module and the collimating lens unit, the light source system is switched between the first mode and the second mode, the illumination light with the first color temperature is emitted in the first mode, and the illumination light with the second color temperature is emitted in the second mode, thereby expanding the application scenario of the light source system and the light efficiency of the light source system. It is understandable that, for a scheme in which the light emitting diode module includes different colors, brightness, or color rendering indexes, the light source system may emit illumination light having a first color, first brightness, or first color rendering index in the first mode, and emit illumination light having a second color, second brightness, or second color rendering index in the second mode.

In some embodiments, for how to adjust the position between the light emitting diode module and the collimating lens unit, the present disclosure provides an alignment between the light emitting diode module and the collimating lens unit by adjusting the displacement of the collimating lens group 30.

In some embodiments, referring to FIG. 8 to FIG. 12, the system includes a collimating lens group 30 and an adjusting mechanism 60 for adjusting the collimating lens group 30. The collimating lens group 30 includes a lens support 31 and a collimating lens unit 301 provided on the lens support 31. The lens support 31 includes a support plate 311, the support plate 311 is provided with multiple lens holes 312, and the collimating lens unit 301 is provided in the lens holes. The lens support 31 includes a first mounting portion 3131, a second mounting portion 3132, a first mounting member 3133, and a second mounting member 3134 located on the support plate. The first mounting portion 3131, the second mounting portion 3132, the first mounting member 3133, and the second mounting member 3134 are extensions from an outer edge of the support plate 311. The end portions of the first mounting portion 3131 and the second mounting portion 3132 are provided as protruding columns. The first mounting member 3133 and the second mounting member 3134 respectively include a first sleeve member and a second sleeve member, and the first mounting member 3133 and the second mounting member 3134 are respectively mounted and fixed through the first sleeve member and the second sleeve member. In some embodiments, the lens support 31 includes a bearing mounting hole 3135.

Figure 10:
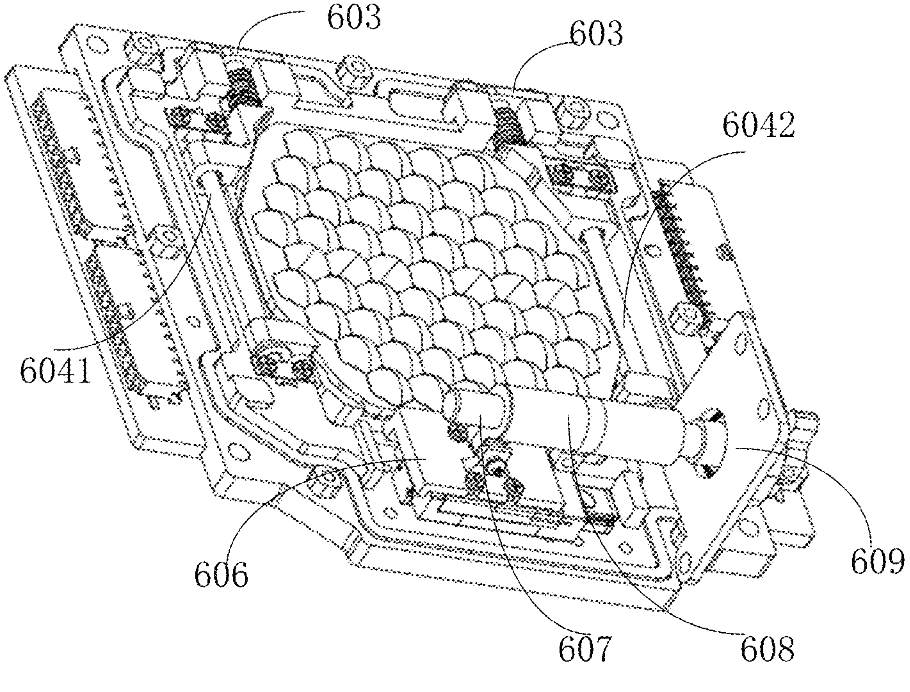
FIG. 10 is a schematic diagram showing assembly of an adjusting mechanism and a lens support according to an embodiment of the present disclosure.
Figure 11:
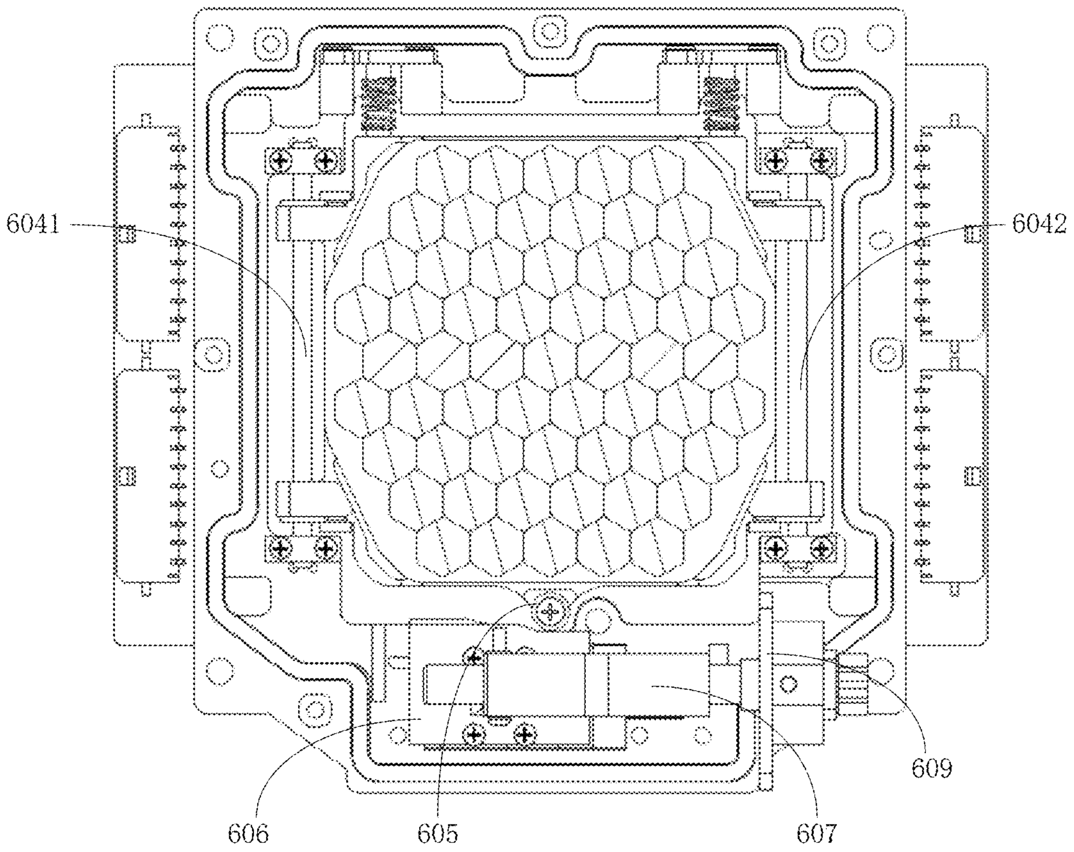
FIG. 11 is a schematic diagram showing assembly of an adjusting mechanism and a lens support according to an embodiment of the present disclosure.
Figure 12:
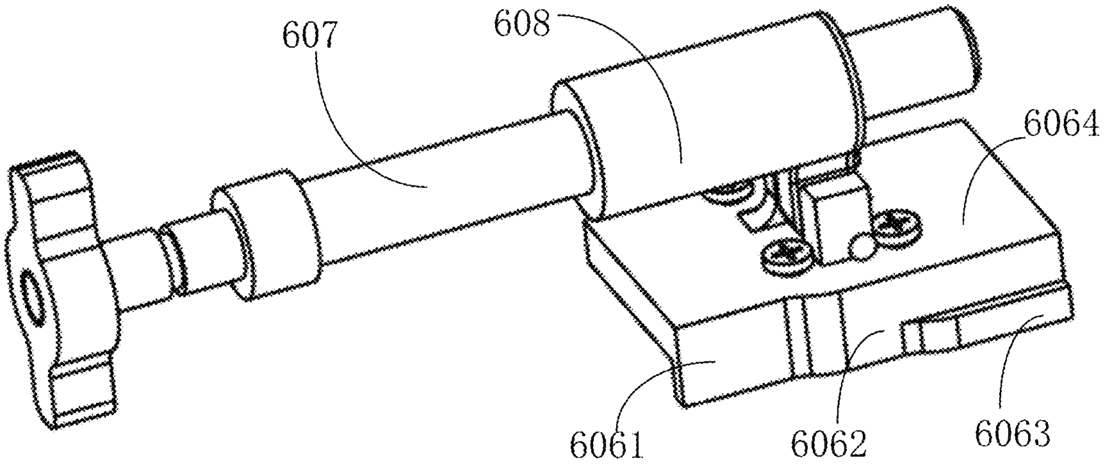
FIG. 12 is a schematic structural diagram of an adjusting block according to an embodiment of the present disclosure.

The adjusting mechanism 60 includes a mounting support 601, the mounting support 601 includes an assembly area located at an edge of the mounting support 601 and an accommodation area 604 located at a center of the mounting support 601. The accommodation area 604 is configured for accommodating a support plate 311 of the collimating lens group 30, and the adjusting mechanism 60 includes a first mounting groove 6021, a second mounting groove 6022, a first mounting composite groove 6023, a second mounting composite groove 6024 and a first mounting platform 6025 located in the assembly area of the mounting support 601. Referring to FIG. 10 and FIG. 11, the adjusting mechanism 60 includes a first limiting module and a second limiting module 603, the first limiting module includes a first limiting plate and a first spring. The first limiting plate is fixed to an opening part of the first mounting groove 6021 by through locking screw, a first limiting column is provided on a side of the first limiting plate facing the mounting groove. When the lens support 31 is assembled with the adjusting mechanism 60, the first mounting portion 3131 of the lens support 31 is accommodated in the first mounting groove 6021, the second mounting portion 3132 is accommodated in the second mounting groove 6022. The first spring is provided in the first mounting groove 6021, one end of the first spring is sleeved on a protruding column at an end portion of the first mounting portion 3131 of the lens support, and the other end of the first spring is sleeved on the first limiting column on the side of the first limiting plate. The second limiting module includes a second limiting plate and a second spring, and the second spring is provided in the second mounting groove 6022. One end of the second spring is sleeved on a protruding column at an end portion of the second mounting portion 3132 of the lens support, and the other end of the second spring is sleeved on the second limiting column on the side of the second limiting plate. The spring provides an elastic force for the lens support to the accommodation area.

The adjusting mechanism 60 includes a first screw 6041 and a second screw 6042, when the lens support 31 is assembled with the adjusting mechanism 60, the first sleeve member and the second sleeve member included in the first mounting member 3133 of the lens support 31 are sleeved on the first screw 6041. Meanwhile, two ends of the first screw 6041 are arranged in the first mounting composite groove 6023 of the mounting support 601 through pressing the two ends of the first screw 6041 in the first mounting composite groove 6023 by means of screw locking pressure plates. The first sleeve member and the second sleeve member included in the second mounting member 3134 of the lens support 31 are sleeved on the second screw 6042. Meanwhile, two ends of the second screw 6042 are arranged in the second mounting composite groove 6024 of the mounting support 601 through pressing the two ends of the second screw 6042 in the second mounting composite groove 6024 by means of screw locking plates. After assembling, the lens support 31 is mounted on the adjusting mechanism 60, since the mounting member of the lens support is sleeved on the screw, the lens support may only move along the central axis direction of the screw.

The adjusting mechanism includes a bearing 605, the bearing 605 is locked in the bearing mounting hole 3135 of the lens support 31 through a screw. The aperture of the bearing is larger than the diameter of the screw and smaller than the diameter of the nut, so that the bearing may rotate around the screw.

The adjusting mechanism 60 includes a first mounting platform 6025 and a slide rail provided on the first mounting platform 6025. The adjusting mechanism further includes an adjusting block 606, a side of the adjusting block 606 facing the first mounting platform 6025 is provided with a slide groove, and the adjusting block 606 is assembled on the first mounting platform 6025 by clamping the slide groove with the slide rail, so that the adjusting block 606 moves on the first mounting platform 6025 through the slide rail. In some embodiments, the adjusting block includes an abutting surface arranged facing the bearing 605, and the abutting surface includes a first step 6061, a second step 6062, and a third step 6063 having a height difference therebetween. In a working state, one of the first step 6061, the second step 6062, and the third step 6063 abuts against the bearing 605. It should be noted that the step is pressed on the bearing, and the bearing rolls between different steps of the adjusting surface. When rolling between different step surfaces, the step squeezes the lens support to move in a direction perpendicular to the step surface.

The adjusting mechanism includes an adjusting screw 607 and a sleeve 608, the sleeve 608 is fixed to the mounting surface 6064 of the adjusting block 606 by screws. It is understandable that in some other embodiments, the sleeve 608 may also be fixed to the mounting surface 6064 of the adjusting block 606 by welding. In some embodiments, the inner wall of the sleeve 608 is provided with a threaded structure, the outer side wall of the adjusting screw is provided with a threads structure, the sleeve 608 is sleeved on the adjusting screw, and the sleeve 608 is in threaded connection with one end of the adjusting screw 607.

In some embodiments, the adjusting mechanism includes a screw fixing base 609, the screw fixing base 609 is of a plate-shaped structure, the plate-shaped structure is vertically fixed to the first mounting platform 6025 of the adjusting mechanism 60. The screw fixing base is provided with a screw through hole, the other end of the adjusting screw 607 penetrates through the screw fixing base 609 and is slidably arranged on the screw fixing base 609. It should be noted that, the end portion of the adjusting screw 607 is provided with a rotating wheel, and the adjusting screw may be driven to rotate by twisting the rotating wheel. Rotating the adjusting screw 607 may drive the adjusting block 606 to move along the direction of the central axis of the screw, since the adjusting block 604 is provided with three steps abutting against the bearing 605, during the process that the adjusting block 606 moves along the central axis of the screw, different steps abut against the bearing 605. Different steps abutting against the bearing 605 may generate different movements along the direction perpendicular to the plane of the steps, and since the bearing 605 is arranged on the lens support, the bearing 605 drives the lens support to move along the direction perpendicular to the plane of the steps.

Figure 13:
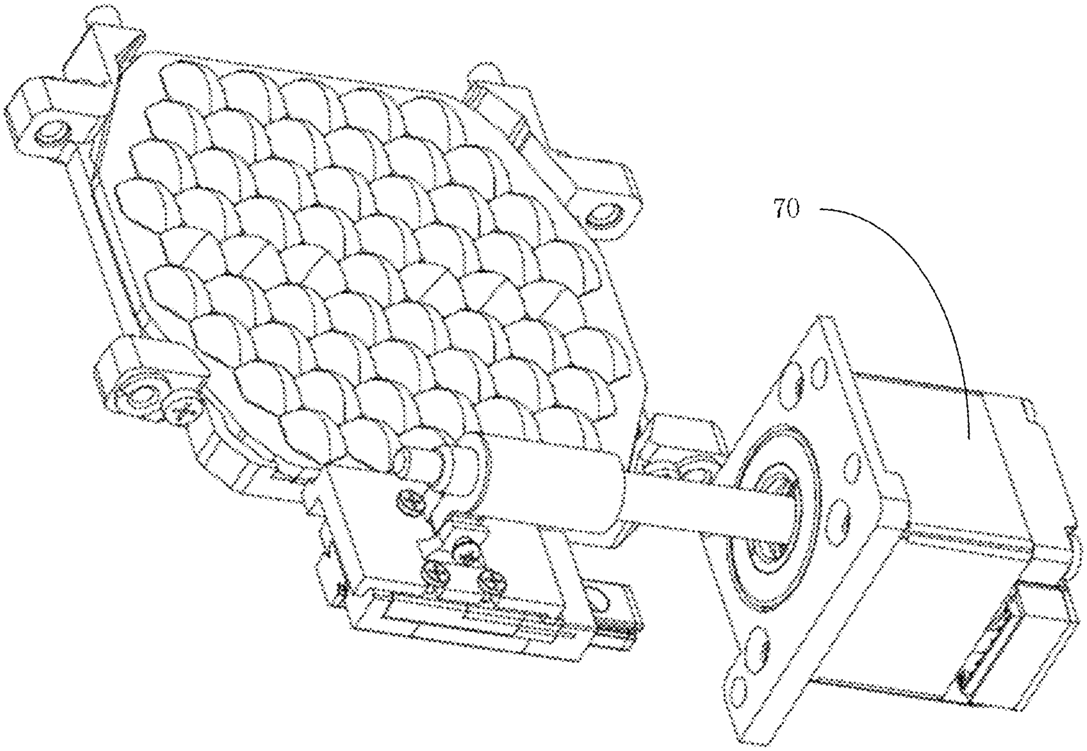
FIG. 13 is a schematic diagram showing assembly of an adjusting mechanism and a lens support according to another embodiment of the present disclosure.

It should be noted that, in some other embodiments, as shown in FIG. 13, one end of the adjusting screw 607 is connected to the motor 70, and the motor 70 is turned on to drive the adjusting screw 607 to rotate to drive the adjusting block 606 to move.

It should be noted that the bearing may roll on the first step or the second step surface, the bearing does not move along the length direction of the mounting groove when rolling against the first step, and the bearing moves along the direction perpendicular to the plane of the step only when rolling from the first step to the second step.

In the specific adjusting process of the collimating lens group 30, firstly, the adjusting screw 607 is driven to rotate, the adjusting screw 607 rotates to drive the adjusting block 606 to move in the direction of the central axis of the screw, and different step surfaces abut against the bearing 605 during the movement of the adjusting block 606. When the first step 6061 abuts against the bearing, under the action force of the spring on the other side of the lens support 31, the collimating lens group 30 and the light source mechanism 20 are at the first relative position. In this position, the first light emitting diode chip 211 included in the light source mechanism 20 is aligned with the collimating lens unit 301, and the light source system is in the first mode. During the movement of the adjusting block 606, the second step 6062 abuts against the bearing 605, and since the height of the second step 6062 is higher than that of the first step 6061, the bearing 605 moves along the direction perpendicular to the plane of the step under the force of the spring on the other side of the lens support 31 and abuts against the second step 6062. In this position, the second light emitting diode chip 212 included in the light source mechanism 20 is aligned with the collimating lens unit 301, and the light source system is in the second mode. It is understandable that, the light source mechanism 20 in the embodiments includes two light emitting chips with different properties, and this may also be applied to the light source mechanism 20 including three light emitting chips with different properties. That is, in the third mode, the third step 6063 of the adjusting block 606 abuts against the bearing 605, and the third light emitting diode chip included in the light source mechanism 20 is aligned with the collimating lens unit 301.

Figure 14:
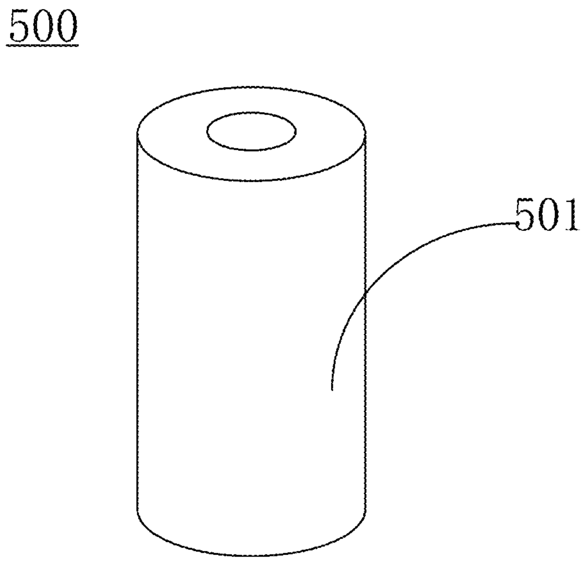
FIG. 14 is a schematic structural diagram of a light emitting device according to an embodiment of the present disclosure.

Referring to FIG. 14, the present disclosure provides a light emitting device 500, and the light emitting device 500 includes the light source system according to any one of the foregoing embodiments. The light emitting device 500 can be a spotlight, a reflector light, a cinema projector, an engineering projector, a micro projector, an education projector, a wall-mounted projector, a laser TV, and so on. The light emitting device 500 includes a housing 501, and the light source system 500 is disposed in the housing 501, and the housing 501 can protect the light source system 500 and prevent the light source system 500 from being directly impacted by the external environment.

The various embodiments in the present specification are described in a progressive manner, and each embodiment focuses on differences from other embodiments, and the same and similar parts between the various embodiments may be referred to each other.

The description merely includes some embodiments of the present disclosure, and is not intended to limit the patent scope of the present disclosure, and any equivalent structure or equivalent process transformation made by using the specification and accompanying drawings of the present disclosure, or other directly or indirectly applications related technical fields, which are included in the patent protection scope of the present disclosure.

What is claimed is:

1. A light source system, comprising:

a light source mechanism comprising a light source substrate and a plurality of light emitting diode modules provided on the light source substrate, wherein the light emitting diode module includes at least two light emitting diode chips;

a collimating lens group comprising a lens support and collimating lens units provided on the lens support, wherein the collimating lens unit is configured for collecting exiting light of the light emitting diode module; and an adjusting mechanism comprising a mounting support, an adjusting block and a bearing, wherein the lens support is assembled on the mounting support, the adjusting block comprises an abutting surface arranged facing the bearing, the abutting surface comprises a plurality of steps having a height difference therebetween, and when the bearing rolls between the plurality of steps of the abutting surface, step surfaces of the plurality of steps squeeze the lens support to move in a direction perpendicular to the step surfaces.

2. The light source system according to claim 1, wherein the lens support comprises a support plate and a plurality of lens holes provided in the support plate, and the collimating lens units are provided in the lens holes.

3. The light source system according to claim 2, wherein the lens support further comprises a first mounting portion, a second mounting portion, a first mounting member and a second mounting member that extend from an edge of the support plate, wherein ends of the first mounting portion and the second mounting portion are provided with protruding columns, and the first mounting member and the second mounting member each comprise a first sleeve member and a second sleeve member.

4. The light source system according to claim 3, wherein the mounting support comprises an assembly area located at an edge and an accommodation area located at a center, and the adjusting mechanism further comprises a first mounting groove, a second mounting groove, a first limiting module and a second limiting module located in the assembly area of the mounting support;

the first limiting module comprises a first limiting plate and a first spring, the first limiting plate is fixed to an opening part of the first mounting groove through a locking screw, a first limiting column is provided on a side of the first limiting plate facing the mounting groove, and the first spring is provided in the first mounting groove, wherein one end of the first spring is sleeved on a protruding column at an end of the first mounting portion, and the other end of the first spring is sleeved on the first limiting column of the first limiting plate; and the second limiting module comprises a second limiting plate and a second spring, the second limiting plate is fixed to an opening part of the second mounting groove through a locking screw, a second limiting column is provided on a side of the second limiting plate facing the mounting groove, and the second spring is provided in the second mounting groove, wherein one end of the second spring is sleeved on a protruding column at an end portion of the second mounting portion, and the other end of the second spring is sleeved on the second limiting column of the second limiting plate.

5. The light source system according to claim 4, wherein the adjusting mechanism further comprises a first screw, a second screw, a mounting composite groove and a second mounting composite groove, the first mounting member of the lens support is sleeved on the first screw, and two ends of the first screw are pressed in the first mounting composite groove by means of screw locking plates; and the second mounting member of the lens support is sleeved on the second screw, and two ends of the second screw are pressed in the second mounting composite groove by means of screw locking plates.

6. The light source system according to claim 5, wherein the adjusting mechanism further comprises a first mounting platform and a slide rail provided on the first mounting platform, a side of the adjusting block facing the first mounting platform is provided with a slide groove, and the adjusting block is assembled on the first mounting platform by clamping the slide groove with the slide rail.

7. The light source system according to claim 6, wherein the lens support further comprises a bearing mounting hole, and the bearing is locked in the bearing mounting hole by a screw.

8. The light source system according to claim 7, wherein the adjusting mechanism further comprises an adjusting screw and a sleeve, the sleeve is fixed to a mounting surface of the adjusting block, and the sleeve is sleeved on one end of the adjusting screw through threaded connection.

9. The light source system according to claim 8, wherein the adjusting mechanism further comprises a screw fixing base, the screw fixing base is provided with a screw through hole, the other end of the adjusting screw passes through the screw fixing base and is slidably arranged on the screw fixing base, one end of the adjusting screw is provided with a rotating device, and the rotating device is twisted to drive the adjusting screw to rotate.

10. A light emitting device, comprising a light source system, wherein the light source system comprises:

a light source mechanism comprising a light source substrate and a plurality of light emitting diode modules provided on the light source substrate, wherein the light emitting diode module includes at least two light emitting diode chips;

a collimating lens group comprising a lens support and collimating lens units provided on the lens support, wherein the collimating lens unit is configured for collecting exiting light of the light emitting diode module; and an adjusting mechanism comprising a mounting support, an adjusting block and a bearing, wherein the lens support is assembled on the mounting support, the adjusting block comprises an abutting surface arranged facing the bearing, the abutting surface comprises a plurality of steps having a height difference therebetween, and when the bearing rolls between the plurality of steps of the abutting surface, step surfaces of the plurality of steps squeeze the lens support to move in a direction perpendicular to the step surfaces.

* * * * *